A. T. DAWSON AND G. T. BUCKHAM.
ORDNANCE RECOIL AND RUN-OUT APPARATUS.
APPLICATION FILED JULY 19, 1919.
1,342,709.  Patented June 8, 1920.
4 SHEETS—SHEET 2.
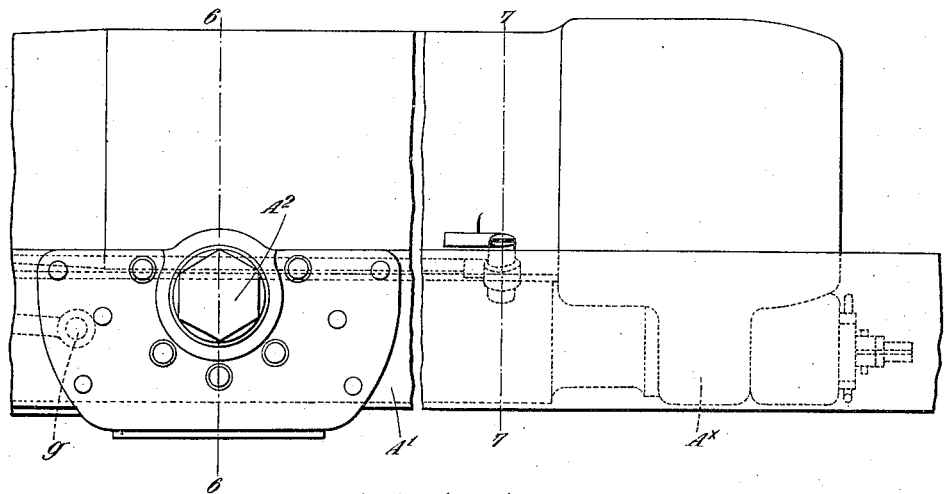
continuation. Fig.1.
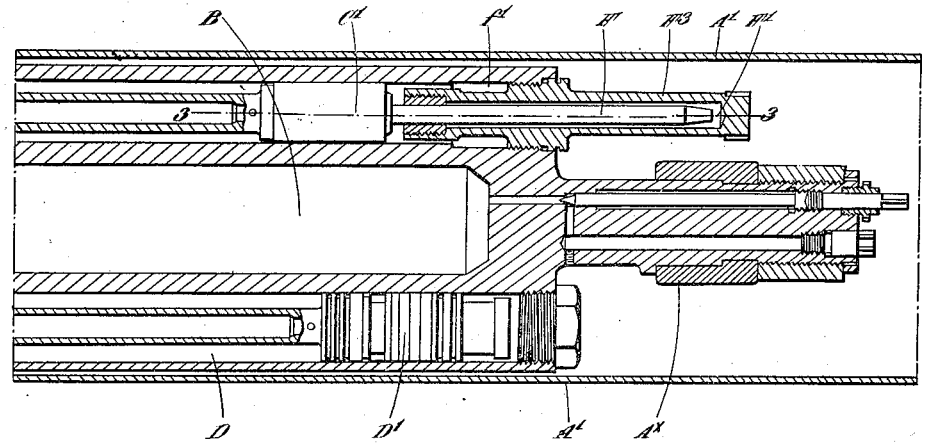
continuation. Fig.2.
Arthur Trevor Dawson,
George Thomas Buckham,
Inventors,
Pennie, Davis, Marvin & Edmonds,
Attorneys.

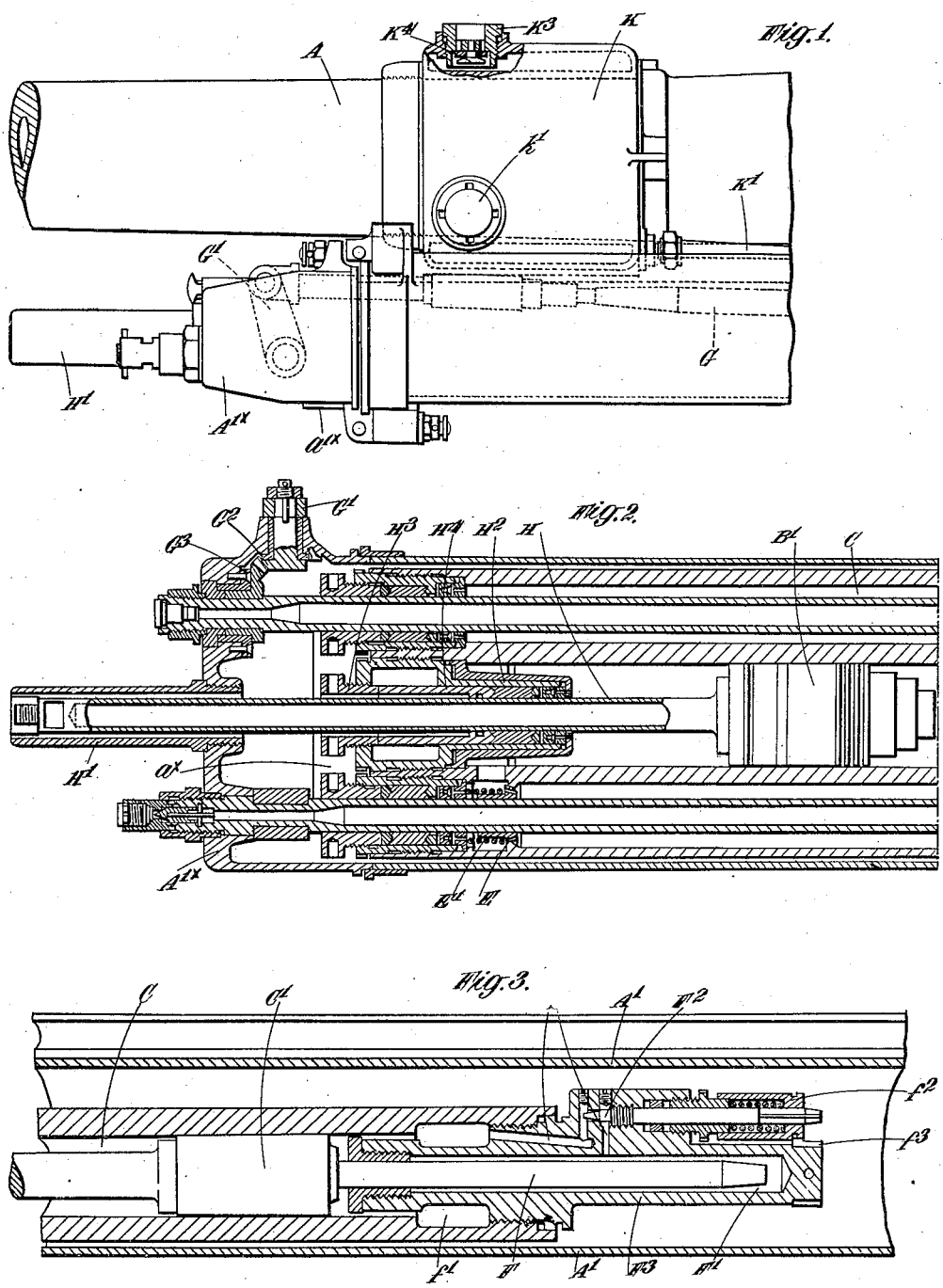

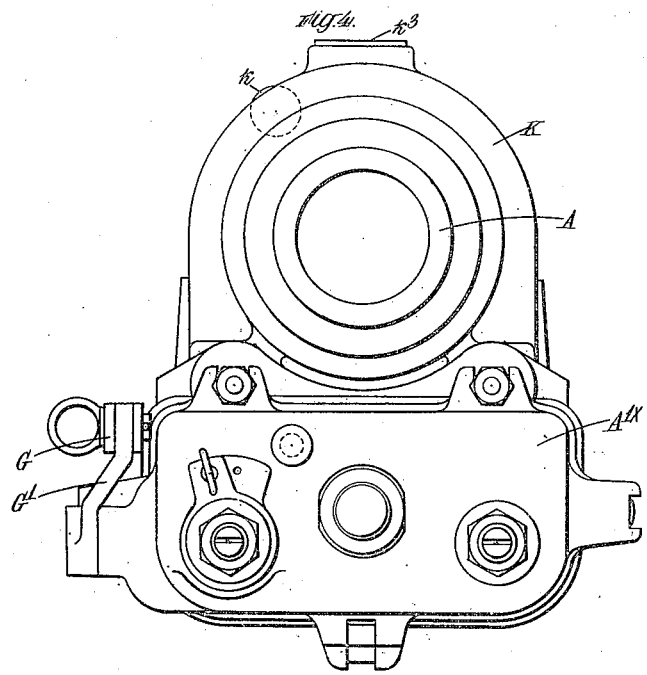
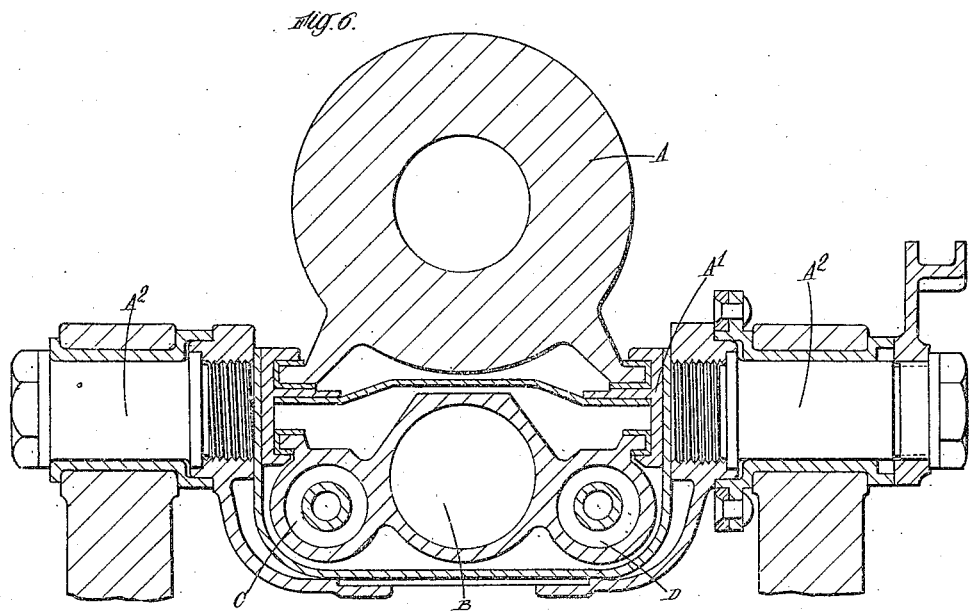

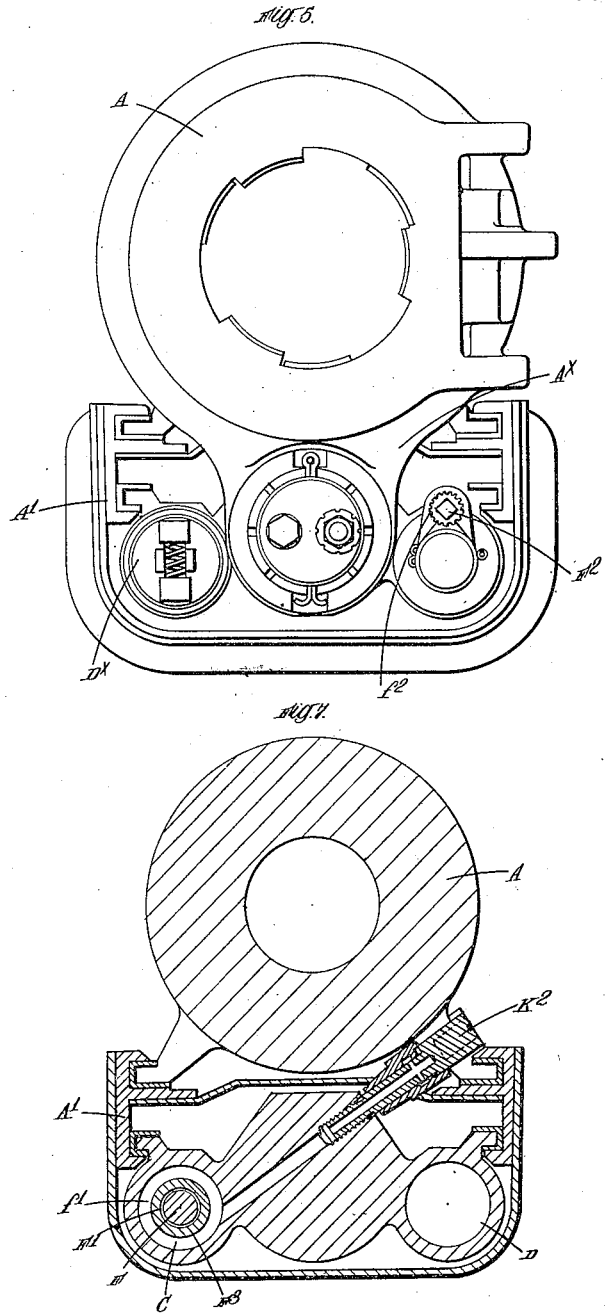

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF LONDON, ENGLAND.

ORDNANCE RECOIL AND RUN-OUT APPARATUS.

1,342,709.　　　　　Specification of Letters Patent.　　Patented June 8, 1920.

Application filed July 19, 1919. Serial No. 312,100.

*To all whom it may concern:*

Be it known that we, Sir ARTHUR TREVOR DAWSON, knight, and Sir GEORGE THOMAS BUCKHAM, knight, both subjects of the King of Great Britain, residing at Vickers House, Broadway, Westminster, in the county of London, England, have invented certain new and useful Improvements in or Relating to Ordnance Recoil and Run-Out Apparatus, of which the following is a specification.

This invention relates to ordnance recoil and run-out apparatus of the hydro-pneumatic type particularly to such apparatus having an air reservoir (preferably provided with a floating piston for separating the liquid from the air), a recuperator cylinder communicating with the air reservoir and a recoil or brake cylinder which is distinct from the recuperator cylinder and does not communicate with the air reservoir.

According to the present invention, in order to obtain a shallower gun cradle than is possible in existing forms of recoil and run-out apparatus of the above mentioned type, the recoil cylinder and the recuperator cylinder are arranged one on each side of, and at approximately the same level as, the air reservoir.

The recoil piston has a retarding ram which, during the final portion of the run-out movement, enters a chamber supplied with liquid from the recoil cylinder and thereby displaces the liquid in the chamber, causing it to be forced back into the cylinder through a passage controlled by an adjustable valve which by its adjustment (without necessitating its removal) serves to vary as required the rate of flow of the liquid so displaced.

The aforesaid floating piston of the air reservoir is of the differential pressure type having a rod which protrudes through the front wall of the reservoir and through the front cap of the cradle to which the rods of the recoil and the recuperator pistons are attached, this cap having a forwardly extending sleeve which surrounds and protects the protruding portion of the said rod; the position of this protruding portion gives an indication of the amount of liquid in the run-out portion of the apparatus and shows when it becomes necessary to augment the supply of liquid. In order to reduce as far as is practicable the amount by which the said rod normally protrudes beyond the front cap of the cradle, the stuffing box through which this rod passes may be situated some distance to the rear of the stuffing boxes for the rods of the recoil and recuperator pistons. The adjustable glands of these stuffing boxes may be situated in line with each other transversely and the front cap of the cradle may have an opening for enabling these glands to be adjusted.

Attached to the barrel in front of the trunnions is a liquid reservoir which is connected by a pipe to the rear end of the recoil cylinder and serves to replenish the cylinder with liquid to compensate for that lost by leakage. The position of the reservoir in relation to the trunnions is such that the liquid will be supplied to the cylinder by gravity at all angles of elevation of the gun; the action of gravity is assisted by the pressure resulting from the heating of the contents of the reservoir due to firing of the gun.

In order that the said invention may be clearly understood and readily carried into effect the same will now be more fully described with reference to the accompanying drawings in which:—

Figure 1 is a side elevation showing a gun provided with a constructional form of our improvements.

Fig. 2 is a sectional plan taken along the axes of the cylinders and the axis of the air reservoir.

Fig. 3 is a section taken approximately on the line 3, 3 of Fig. 2 and drawn to an enlarged scale.

Fig. 4 is a front elevation of Fig. 1.

Fig. 5 is a rear elevation of Fig. 1.

Fig. 6 is a section taken approximately on the line 6, 6 of Fig. 1 and,

Fig. 7 is a section taken approximately on the line 7, 7 of Fig. 1.

A is the gun, A' is the gun cradle, and $A^2$, $A^2$ are the trunnions. B is the air reservoir containing the floating piston B', C is the recoil or brake cylinder, C' is the recoil or brake piston, D is the recuperator cylinder and D' is the recuperator piston. In the construction shown, the air reservoir B and the cylinders C, D are made in a single casting or forging which is situated beneath the gun and is connected at its rear to a lug $A^x$ on the gun as is well understood and the rods of the pistons, C', D' are connected at their front ends to the front cap A'ˣ of the gun cradle.

It will be observed from Figs. 4 to 7 that the cylinders C, D are arranged one on each side of and at approximately the same level as the air reservoir B; the air reservoir is however of larger diameter than the said cylinders and the reservoir is in this case situated with its axis some distance above a horizontal plane containing the axis of the cylinders so that the lower part of the air reservoir is level with the lower part of the cylinders as shown.

E (Fig. 2) is a lift valve which is controlled by a spring E' tending to hold the said valve on its seating at the front end of the recuperator cylinder D. This valve is formed with small holes as shown through which the liquid is forced from the air reservoir to the recuperator cylinder to effect the running out of the gun, the said small holes providing the required restriction of the flow of liquid from the air reservoir to the recuperator cylinder; the said valve is lifted off its seating against the resistance of its spring during the recoil movement of the gun to provide a relatively unrestricted flow of liquid from the recuperator cylinder to the air reservoir.

F is the aforesaid retarding ram projecting rearwardly from the recoil or brake piston C', and F' is the aforesaid chamber from which the ram F displaces liquid through the passage $f$ (Fig. 3) back to the cylinder C during the final portion of the run-out movement of the gun. F² (Fig. 3) is the aforesaid adjustable valve which is arranged in the passage $f$ and is shown as being of the screw-down type. The forward end of the passage $f$ enters a recess $f'$ in communication with the rear end of the cylinder C. In the construction shown the chamber F' and the passage $f$ are formed in a plug F³ screwed into the rear end of the cylinder C. The valve F² is retained in its adjusted position by the engagement of the teeth on a spring controlled sleeve $f^2$ with corresponding teeth on a collar $f^3$ on the rear part of the plug F³; this sleeve being slidably connected to the stem of the valve F² and being displaced forward to disengage the teeth by the placing in position on the rear squared end of this stem of a key or other tool for operating the valve.

A cut-off gear operating upon the recoil piston C' is employed for varying the recoil movement in accordance with the angle of elevation at which the gun is fired, this gear comprising an actuating rod G pivoted at its rear end to the gun carriage at a point $g$ some distance from the axis of the trunnions and at its front end to an arm G' connected to a bevel segment G² meshing with another segment G³ attached to the rod of the piston C'.

In this manner, owing to the position of the point $g$ in relation to the axis of the gun trunnions, angular movement is given to the piston C' during the elevation of the gun and the port area through the piston is thereby varied in any suitable or known manner.

H is the aforesaid rod of the floating piston B' for indicating by its position when it is necessary to replenish the air reservoir and the recuperator cylinder with liquid and H' is the projecting sleeve for the portion of the said rod that protrudes beyond the front cap A'ˣ of the gun cradle. This sleeve in the example shown is connected by screw threads to the front cap A'ˣ and is of sufficient length to cover the whole of the protruding portion of the rod when the air reservoir and the recuperator cylinder are supplied with the proper quantity of liquid; in the event of leakage of the liquid occurring, the front end of the said rod projects more or less beyond the end of the sleeve and thus shows that more liquid should be supplied. H² is the stuffing box through which the rod H passes, this stuffing box being, as aforesaid, situated some distance to the rear of those for the rods of the pistons C' and D'; in this manner we are able to reduce as far as is practicable the amount by which the rod H protrudes beyond the front cap A'ˣ and consequently the length of the sleeve H'. The adjustable gland H³ of the stuffing box H² is situated in line transversely with those of the other stuffing boxes and a sleeve H⁴ is interposed between the gland H³ and the packing ring of the said stuffing box H². The front cap A'ˣ of the cradle has an opening $a^x$ (Fig. 2) in its lower part for enabling the various glands to be adjusted and this opening may be closed by a movable door or shutter $a'^x$ (Fig. 1).

K is the aforesaid liquid reservoir which in the example shown is arranged around the barrel some distance in front of the gun trunnions and K' is the pipe leading from the lower part of this reservoir to the rear end of the recoil cylinder C. The reservoir is supplied with liquid through a hole in the upper part of the reservoir and this hole is normally closed by a screw threaded plug K³ having a non-return valve K⁴ for the entry of air to the upper part of the reservoir so as to permit the liquid to flow freely from the reservoir to the cylinder. The position of the reservoir is such that at all angles of elevation of the gun the liquid therein can flow by gravity to the cylinder C and this action of gravity may be assisted by the air-pressure in the upper part of the reservoir due to the heating of the contents by the barrel; a safety valve is provided at $k$ (Fig. 4) to prevent the pressure of air from rising too high. The side wall of the reservoir has an inspection window $k'$ (Fig. 1) for ascertaining when the reservoir should be replenished with liquid. The said reservoir, instead of being arranged around the barrel as shown, might be placed on one side or the other or on top of the barrel.

Although in the construction shown the recoil and recuperator cylinders and the air reservoir are connected to the gun and the recoil and recuperator pistons are connected to the front cap of the cradle, a converse arrangement could if desired be employed as is well understood.

What we claim and desire to secure by Letters Patent of the United States is:—

1. In ordnance recoil and run-out apparatus of the hydro-pneumatic type, the combination of an air reservoir, a recuperator cylinder communicating with the air reservoir and arranged at one side of, and at approximately the same level as, the said reservoir and a recoil or brake cylinder which does not communicate with the air reservoir and is arranged at the other side of, and at approximately the same level as, said reservoir, the axes of the cylinders lying in a horizontal plane which is not above the axis of the horizontal plane of the axis of the reservoir.

2. In ordnance recoil and run-out apparatus of the hydro-pneumatic type, a single member formed to provide an air reservoir, a recoil or brake cylinder and a recuperator cylinder, the said cylinders being arranged one on each side of the air reservoir, the axes of the cylinders lying in a horizontal plane which is not above the axis of the horizontal plane of the axis of the reservoir.

3. In ordnance recoil and run-out apparatus, the combination with the recoil or brake cylinder and its piston, of a chamber supplied with liquid from said cylinder, a retarding ram which is carried by said piston and enters said chamber during the final portion of the run-out movement, a passage communicating between said chamber and said cylinder and a valve adjustable without removal which, by its adjustment, serves to vary as required the rate of flow of the liquid displaced through said passage from said chamber by the retarding ram.

4. In ordnance recoil and run-out apparatus, the combination with the recoil or brake cylinder and its piston, of a chamber supplied with liquid from said cylinder, a retarding ram which is carried by said piston and enters said chamber during the final portion of the run-out movement, a passage communicating between said chamber, and said cylinder and a screw-threaded valve adjustable without removal which, by its adjustment, serves to vary as required the rate of flow of the liquid displaced through said passage from said chamber by the retarding ram.

5. In ordnance recoil and run-out apparatus of the hydro-pneumatic type, the combination with the air reservoir, its floating piston, the rod of said piston, the recoil or brake piston rod and the recuperator piston rod, of stuffing boxes for said rods, the stuffing box for the floating piston rod being situated some distance behind the other stuffing boxes.

6. In ordnance recoil and run-out apparatus of the hydro-pneumatic type, the combination with the air reservoir, its floating piston, the rod of said piston, the recoil or brake piston rod and the recuperator piston rod, of stuffing boxes for said rods, the stuffing box for the floating piston rod being situated some distance behind the other stuffing boxes, and an adjustable gland for each of said stuffing boxes, all these glands being arranged in line with each other transversely.

7. In ordnance recoil apparatus, the combination with the gun barrel and the recoil or brake cylinder, of a reservoir attached to the gun barrel for supplying liquid to said cylinder.

8. In ordnance recoil apparatus, the combination with the gun barrel and the recoil or brake cylinder, of a reservoir surrounding and attached to the gun barrel at point some distance in front of the axis of elevation of the gun barrel, for supplying liquid to said cylinder.

9. In ordnance recoil apparatus, the combination with the gun barrel and the recoil or brake cylinder, of a reservoir surrounding and attached to the gun barrel at a point some distance in front of the axis of elevation of the gun barrel, for supplying liquid to said cylinder by gravity and means whereby the heating of the contents of the reservoir from the gun barrel causes pressure to be exerted on the liquid in the reservoir to assist the action of gravity.

ARTHUR TREVOR DAWSON.
GEORGE THOMAS BUCKHAM.